United States Patent [19]
Robertson

[11] Patent Number: 6,143,187
[45] Date of Patent: *Nov. 7, 2000

[54] FLUIDIZED BED FILTER FOR AN AQUARIUM

[76] Inventor: Mark B. Robertson, 5610 NW. 31st Ter., Gainesville, Fla. 32653

[*] Notice: This patent is subject to a terminal disclaimer.

[21] Appl. No.: 09/467,458

[22] Filed: Dec. 20, 1999

Related U.S. Application Data

[63] Continuation of application No. 08/918,466, Aug. 26, 1997, abandoned, which is a continuation-in-part of application No. 08/703,307, Aug. 26, 1997, Pat. No. 5,792,368, which is a continuation-in-part of application No. 08/783,528, Jan. 14, 1997, Pat. No. 5,879,567, which is a continuation of application No. 08/320,464, Oct. 7, 1994, abandoned.

[51] Int. Cl.$^7$ .................................................. A01K 63/04
[52] U.S. Cl. ...................... 210/786; 210/169; 210/416.2; 210/354; 210/263; 119/259
[58] Field of Search ..................... 210/786, 616, 210/169, 416.2, 252, 287, 295, 354, 263; 119/259, 260, 261

[56] References Cited

U.S. PATENT DOCUMENTS

| | | |
|---|---|---|
| 1,784,132 | 12/1930 | Cabrera . |
| 2,546,650 | 3/1951 | Nijboer .................................. 210/786 |
| 3,381,822 | 5/1968 | Martin . |
| 3,513,091 | 5/1970 | Bevans ................................... 210/786 |
| 3,767,048 | 10/1973 | Prengemann ........................... 210/786 |
| 3,892,663 | 7/1975 | Wiedenmann ......................... 210/169 |
| 4,043,936 | 8/1977 | Francis et al. . |
| 4,126,546 | 11/1978 | Hjelmner et al. ...................... 210/786 |
| 4,411,780 | 10/1983 | Suzuki et al. . |
| 4,582,600 | 4/1986 | Atkinson et al. ....................... 210/151 |
| 4,612,115 | 9/1986 | Titoff ..................................... 210/786 |
| 4,834,872 | 5/1989 | Overath . |
| 4,894,149 | 1/1990 | Block .................................... 210/169 |
| 4,954,257 | 9/1990 | Vogelpohl et al. . |
| 5,055,186 | 10/1991 | Van Toever ............................ 210/150 |
| 5,096,814 | 3/1992 | Aivasidis et al. . |
| 5,171,438 | 12/1992 | Korcz .................................... 210/169 |
| 5,172,650 | 12/1992 | Hsu et al. .............................. 210/169 |
| 5,232,586 | 8/1993 | Malone .................................. 210/151 |
| 5,250,187 | 10/1993 | Franks . |
| 5,306,421 | 4/1994 | Weinstein .............................. 210/169 |
| 5,314,621 | 5/1994 | Rogalla et al. . |
| 5,353,745 | 10/1994 | Fahs, II ................................. 119/226 |
| 5,447,629 | 9/1995 | Chaumont et al. . |

(List continued on next page.)

FOREIGN PATENT DOCUMENTS

| | | |
|---|---|---|
| 3516617 | 11/1986 | Germany . |
| 4032265 | 4/1992 | Germany . |
| 291695 | 11/1988 | Japan . |
| 2111497 | 4/1990 | Japan . |
| 1680265 | 9/1991 | U.S.S.R. ................................ 210/786 |
| 9611045 | 4/1996 | WIPO . |

OTHER PUBLICATIONS

Malone, R.F., D.G. Burden (1988) "Design of Recirculating Soft Crawfish Shedding Systems" Louisana Sea Grant College, Baton Rouge, LA.

Bullock, G., J. Hankins, J. Heinen, C. Starliper, J. Teska (1993) "Qualitative and Quantitative Bacteriological Studies on a Fluidized San Biofilter Used in a Semiclosed Trout Culture System" Biological Report 17, Jul.

Webster's New World Dictionary, Third College Edition ©1988, p. 234, Definition of "Channel.".

*Primary Examiner*—Robert J. Popovics
*Attorney, Agent, or Firm*—Saliwanchik, Lloyd & Saliwanchik

[57] ABSTRACT

Improved fluidized bed filters are described and claimed. The filters are exemplified for use in aquarium systems. A preferred embodiment of the filter of the subject invention comprises a cylinder having an inlet port. Water is pumped into the inlet port. The force of the water fluidizes the filter medium within the cylinder. Filtered water escapes the system over the open end of the cylinder or through an outlet channel.

9 Claims, 6 Drawing Sheets

U.S. PATENT DOCUMENTS

| | | | |
|---|---|---|---|
| 5,453,183 | 9/1995 | Hoffa | 210/169 |
| 5,466,373 | 11/1995 | Handwecker et al. | 210/150 |
| 5,527,455 | 6/1996 | Hoffa | 210/169 |
| 5,560,318 | 10/1996 | Yoshida et al. | 119/260 |
| 5,571,409 | 11/1996 | Scarborough | 210/169 |
| 5,632,887 | 5/1997 | Gargas et al. | 210/169 |
| 5,672,268 | 9/1997 | Mizrahi et al. | 210/169 |
| 5,705,057 | 1/1998 | Hoffa | 210/169 |
| 5,792,368 | 8/1998 | Robertson | 210/169 |
| 5,879,567 | 3/1999 | Robertson | 210/169 |
| 5,965,016 | 10/1999 | Suchowski et al. | 210/169 |

FLUIDIZED BED FILTER FOR AN AQUARIUM

CROSS-REFERENCE TO A RELATED APPLICATION

This is a continuation of application Ser. No. 08/918,466, filed Aug. 26, 1997, now abandoned, which is a continuation-in-part of application Ser. No. 08/703,307, filed Aug. 26, 1996, now U.S. Pat. No. 5,792,368; which is also a continuation-in-part of application Ser. No. 08/783,528, filed Jan. 14, 1997, now U.S. Pat. No. 5,879,567; which is a continuation of application Ser. No. 08/320,464, filed Oct. 7, 1994, now abandoned.

BACKGROUND OF THE INVENTION

Fluidized bed filters are used widely in aquaculture, water purification, and wastewater treatment. These filters can also be used in bioremediation. Under pneumatic pressure, fluidized bed filters are used to filter and treat gases, to size and separate particles, to mix powdered components, and to coat particulate substrate. The fluidized bed filters used in aquaculture are specialized biological filters which are used to remove waste products from the recirculating culture system.

Aquaculture is a term used generally to describe a variety of methods and systems for producing plants and animals in water environments. Thus, aquaculture can involve not only the cultivation of fish but also includes the cultivation of many aquatic plants and a variety of aquatic animals in addition to fish. Alligators, crawfish, frogs and seaweed are routinely cultivated by aquaculture. As the demand for healthful and exotic foods rises, aquaculture continues to expand. New species are being cultivated and advances are being made toward the increase in production of aquaculture systems. Additionally, the popularity of fresh and saltwater aquariums has enjoyed a resurgence further adding to the demand for better aquaculture systems. As used herein, the term "aquaculture" refers not only to systems for the commercial production of plants and animals, but also to consumer systems such as fresh and saltwater aquariums.

Providing for artificial cultivation of fish and other animals in populations far more dense than in nature, is a difficult prospect. Adequate food and oxygen must be supplied to the population. Further, waste must be continuously removed from the water. To maintain a supply of food and oxygen to the plant or animal population, water can be continuously pumped from a suitable source through an aquaculture system, then discharged. This, however, requires great quantities of water to maintain the system. Unfortunately, water is often a limiting factor in aquaculture. Also, the wastewater must be treated and disposed of properly. Therefore, semi-closed aquaculture systems have been developed in which water is recirculated within the system (Bullock, G., J. Hankins, J. Heinen, C. Starliper, J. Teska [1993] "Qualitative and Quantitative Bacteriological Studies on a Fluidized Sand Biofilter Used in a Semiclosed Trout Culture System," *Biological Report* 17, July). Only small amounts of new water are added periodically in a semi-closed system. Oxygen and nutrients are added to the recirculating water and waste is removed through appropriate filtration and treatment systems.

Waste can be removed from a semi-closed system by utilizing any or all of three types of "filtering" means: mechanical, chemical, and biological. Each type of filter has certain advantages with regard to the type of waste it removes most efficiently. Therefore, the filter types are often used in succession to effectively clean the recirculated water.

Particulate matter can be removed by a mechanical type filter which physically removes solid waste from the water. Mechanical filtration is often the initial step in a filtration process because particulate waste eventually breaks down and can interfere with the operation of other filters. Chemical filters typically absorb or adsorb dissolved organic compounds from the water and most often comprise an inert adsorbent such as activated charcoal.

Biological filters can remove ammonia and other metabolites from the water. Ammonia waste is of particular concern in fish aquaculture because ammonia is generated by the fish population but is toxic to the fish. Therefore, ammonia must be effectively removed from the system. In nature, ammonia waste is normally removed from water through natural processes by "ammonia-eating" bacteria. These bacteria convert ammonia to other nitrogen-containing compounds through their normal metabolic activity. Also, because of the large volume of water in nature, the concentration of ammonia is generally quite low. Fish populations in aquaculture systems are far more dense than in nature; therefore, ammonia cannot generally be adequately removed from these systems by the bacteria which naturally exist in the water. Biological filters are often used, therefore, to assist in the ammonia removal process. Biological filters can comprise bacteria which convert ammonia to other compounds. These bacteria colonize the filter media and use, as a food source, nutrients in the water. Ammonia is a primary food source for the colonizing bacteria and, by the bacterial action, ammonia waste is removed from the water.

A primary function of the biological filters is to concentrate the ammonia-degrading bacteria and to allow them to proliferate. Typically, ammonia is first metabolized to nitrite by Nitrosomas sp. bacteria. Nitrites are also toxic to aquatic life; however, different bacteria convert these nitrites to nitrates. For example, nitrites are converted to nitrates by Nitrobacter sp. bacteria. The nitrates are then converted to harmless, inert nitrogen gas by plants or anaerobic bacteria. Each of the bacterial species necessary to remove the ammonia from the system is present naturally in the water. The concentrated, enriched population of bacteria in a biological filter can efficiently and effectively remove ammonia generated by even dense populations of fish.

Currently, biological filters used in aquaculture include fluidized sand filters (Malone, R. F., D. G. Burden [1988] *Design of Recirculating Soft Crawfish Shedding Systems*, Louisiana Sea Grant College, Baton Rouge, La.). A fluidized sand filter typically comprises a chamber approximately half-filled with sand. An inlet port is positioned in the center of the bottom of the chamber. The sand within the chamber is colonized by bacteria. Waste water is pumped into the system through the inlet port. The force generated by the flow of the water expands, or "fluidizes," the sand within the water-filled chamber. Water contacting the sand colonized by the bacteria is cleansed of ammonia by the action of the bacteria. Treated water leaves the system through an outlet port near the top of the chamber.

Some of the advantages of using a fluidized bed for biological filtration are as follows:

1. There is no mechanical particle capture ability in these filters, which means that they do not clog during use. This is a rather significant problem with other filtration systems. Since the media bed is fluidized and constantly moving, any particles that enter the filter ultimately pass through without becoming lodged.

2. Since a biological filter depends upon bacteria to function, it is very important to have as much surface area available for growth as possible. Fluidized bed filters have very large amounts of surface area, due to the fact that they use a fine grade of media which has high surface area for its volume.

3. What makes a fluidized bed filter especially unique is the fact that it can fully utilize all of the available media surface area, since the media bed is in constant motion. This allows the incoming water to be thoroughly mixed with the bacteria on the medium, instead of passing around it as in a fixed media filter. This method of ammonia removal is highly efficient.

BRIEF SUMMARY OF THE INVENTION

The subject invention pertains to improved fluidized bed filters. The fluidized bed filters of the subject invention are particularly effective in the removal of nitrogenous wastes from aquaculture systems. In a preferred embodiment, the filters of the subject invention are used in an aquarium system. The filters of the subject invention can also be used to remove nitrogenous compounds from surface and groundwaters or soil. Similarly, the filters can be used to remove toxic compounds from environmental samples. The fluidized bed filters of the subject invention can be constructed in a wide range of sizes for use in a variety of systems, i.e., filters for use in aquaculture systems can be constructed in a size to fit a home aquarium or a large commercial system.

In one preferred embodiment, the fluidized bed filter of the subject invention comprises a hollow column (such as a cylinder) which is mounted vertically, has a filter medium within the column, and has an inlet means through which water is delivered to the inside base of the column. Preferably, the column is a cylinder and is filled about half full with a filter medium. Typically, the medium can be colonized by bacteria which metabolize toxins or wastes. This medium can be, for example, sand.

In a preferred embodiment of the subject invention, water can be delivered to the filter of the subject invention through a hollow delivery tube which enters the main filter column at or near the top of the column such that, when the filter is in use, water is pumped through the inlet port and hollow delivery tube and into the main cylinder. The open end of the hollow delivery tube is directed at the closed end of the cylinder. The force of the water contacting the closed end of the cylinder as it exits the hollow delivery tube causes the water to change direction, creating an upward flow pattern within the cylinder. This flow pattern exerts a force sufficient to fluidize the filter medium within the cylinder. The introduction of water into the system through the hollow delivery tube prevents filter media from obstructing the inlet port should the flow of water cease.

In a further embodiment, a bed-breaker is mounted on the center tube to prevent accidental discharge of media from the filter upon startup of operation. When the media rises in the main cylinder on startup, it often does so as a single mass (due to the presence of air). The breaker tears this mass apart before it reaches the top of the cylinder.

Treated water leaves the filter over the top of the main cylinder. In one embodiment, the water which leaves the filter then flows down the side of the column. The filter of this embodiment of the subject invention is typically used inside an aquarium or sump where the water can collect about the base of the filter. Water can be pumped into the filter from the surrounding sump water, and water returns to the sump after exiting over the open end of the filter. Water can be returned to the aquarium from the sump by using a separate pump.

In a preferred embodiment, the water exits the filter by flowing through an outlet channel which leads back to an aquarium. This outlet channel is constructed such that the water flows over sufficient surface area to facilitate aeration and heat dissipation of the water before it returns to the aquarium.

In another embodiment, the filter of the subject invention may have a more constricted outlet port such that the filter operates under slight hydraulic pressure.

Another embodiment of the invention includes a kit wherein the filter is packaged for use by an owner of a home aquarium. A pump, such as a seven watt pump, can be packaged with the filter; the pump supplies the aquarium water to the filter when it is in use.

The filters of the subject invention have important advantages compared to existing devices. For example, the unique overflow design of these filters results in efficient heat dissipation and aeration of the water. Further, it has been discovered that the filters of the subject invention are significantly quieter than other designs.

DETAILED DESCRIPTION OF THE INVENTION

The subject invention pertains to improved fluidized bed filters. In a preferred embodiment, the fluidized bed filter is designed to operate as a biological filter for the removal of ammonia and other nitrogenous wastes from a water supply. This is accomplished, for example, by the colonization of naturally occurring bacteria on the surface of the filter's medium. As water flows past the medium, the bacteria first convert ammonia into nitrite, which is then converted into nitrate by other bacteria present in the medium.

Figure 1:
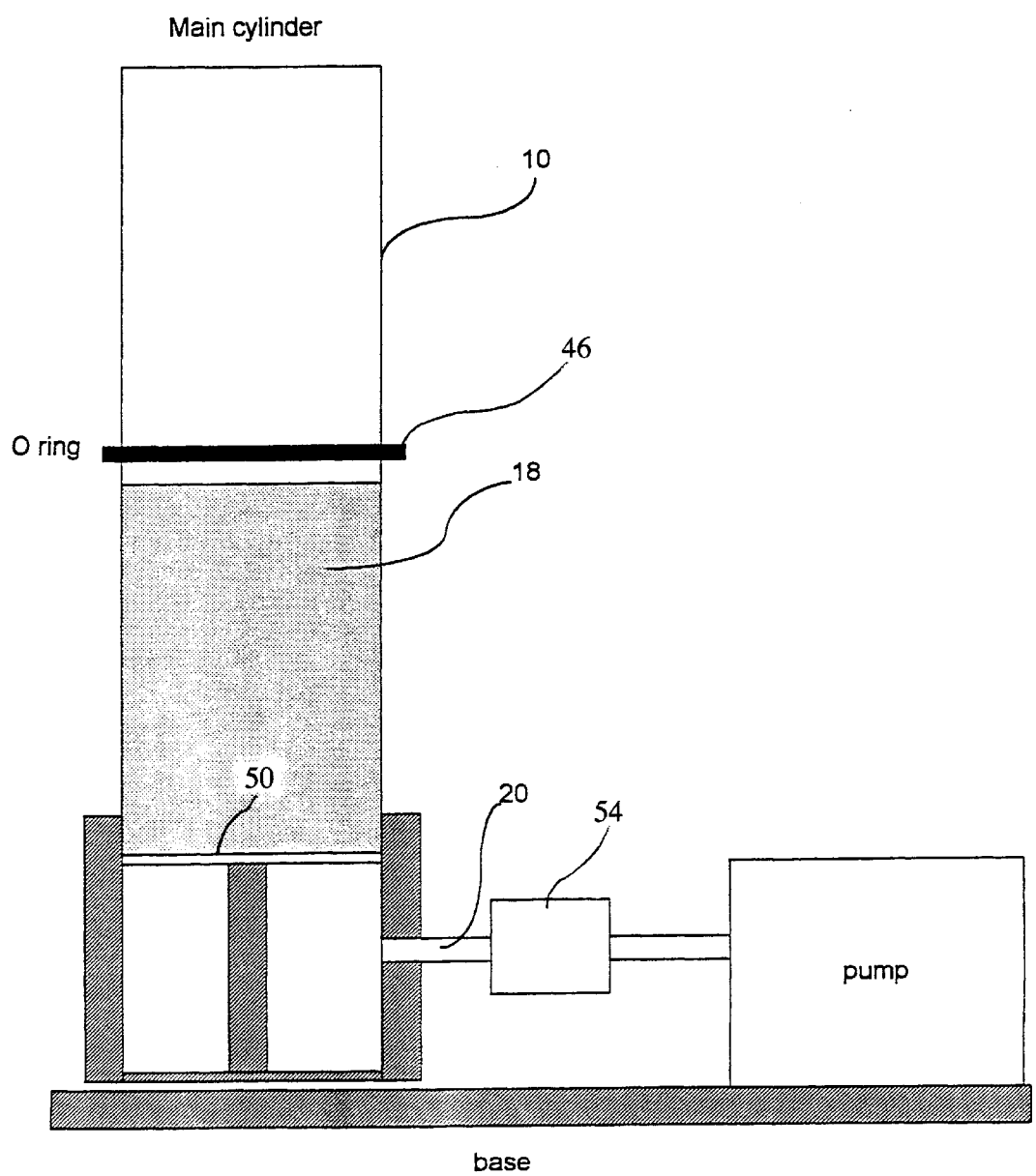
FIG. 1 is an elevational view of one embodiment of the filter of the subject invention.

In a preferred embodiment, the filter of the subject invention is mounted vertically. Typically, the column will be a cylinder. In one embodiment, as shown in FIG. 1, water enters the system of the subject invention from an inlet port 20 at the base of the cylinder. The water flows up from the base into a filter medium 18 which is typically located above the entrance port for the water. A grid 50 or similar device can be used to support the filter medium above the inlet port. Also, the inlet port and/or the conduit bringing the water to the inlet port can be equipped with a valve 54 to prevent backflow and movement of filter media into the conduit and/or pump. The valve may utilize, for example, a ball which settles into the inlet port when there is no water flow.

In an alternate preferred embodiment, as shown in FIGS. 2 through 6, water enters the filter through a hollow delivery tube 124. Typically, the hollow delivery tube 124 enters the main cylinder 10 of the filter at or near the top of the cylinder. In this embodiment, water enters the system of the subject invention from an inlet port 120 and through a hollow delivery tube 124. In a preferred embodiment, the inlet port will be near the top of the cylinder. In this embodiment, the inlet means consists of the inlet port and the hollow delivery tube. The hollow tube is inverted in respect to the bottom of the cylinder.

The introduction of water into the system through the hollow delivery tube 124 creates a unique flow pattern within the cylinder. Because the outlet of the hollow tube is positioned only a short distance from the end cap 114 of the cylinder and is inverted in respect thereto, water forced through the tube is deflected off the bottom of the cylinder causing a reverse flow. This reverse flow effectively fluidizes the filter medium. The unique flow pattern also forces water across the end of the cylinder and prevents settling of filter material into joints and corners.

In a preferred embodiment, the outlet of the hollow delivery tube 124 is close enough to the end of the main cylinder so that, when fluid is exiting the delivery tube, filter media will not accumulate between the end of the delivery tube and the end of the main cylinder. This distance will depend upon the size of the filter and upon flow rate. This distance may be, for example, between about ⅛" and about 1" for home aquarium systems. About ¼" to about ½" is preferred.

Advantageously, filter medium cannot settle into the hollow delivery tube. The delivery tube is inverted in respect to the bottom of the cylinder, which prevents settling media from entering the tube. A check valve can be installed on the inlet port to further prevent the fouling of the delivery tube by a siphoning effect. The filter of the subject invention therefore will not become obstructed and choke when flow to the system is temporarily terminated. In one embodiment, a screen 58 can surround the outlet portion of the hollow delivery tube to reduce the chances of filter media entering the tube.

In one embodiment, the device of the subject invention comprises a drain port 70 which provides ready access to the inside of the hollow delivery tube. Advantageously, this drain port facilitates easy draining of water and/or any obstacle.

In a further embodiment, a small hole can be located top and side of the center inlet tube. This opening acts as a vacuum break and prevents the accidental back-siphoning of water and media through the filter when the pump is shut down. The hole may be, for example, about 0.01 to about 0.1 inches in diameter.

When water enters the main column of the filter, it flows upward through the cylinder, thus expanding the filter medium. The water is treated by contacting the microbes which reside in the filter medium. In one embodiment of the subject invention, the main cylinder of the filter of the subject invention comprises features which reduce the possibility of filter media exiting the filter through the outlet. For example, the cylinder may have one or more step-outs 30 wherein the diameter of the cylinder increases. See FIGS. 3A and 3B. Such step-outs will have the effect of slowing the upward water velocity and catching filter media as it rises. Alternatively, or additionally, the filter may have one or more sand traps 34 located around the periphery of the filter at or near the top of the filter such that water exiting over the top of the filter will enter the trap before proceeding to an outlet channel 38 or over the side of the filter. See FIG. 4. Sand exiting over the top of the main cylinder will be caught in the sand trap 34 and will not accompany the water to the outlet channel.

Treated water exits the system by flowing out the open end of the cylinder. The unique use of the overflow water exit design provides several important advantages compared to other systems where, for example, water exits through a tube. For example, the flow of water down the side of the filter, or through an outlet channel, serves to aerate the water. This system also efficiently dissipates heat.

The outlet channel 38 may be, for example, an open tube, channel, or other surface over which, and through which, the water will flow and be guided back to, for example, an aquarium. In a preferred embodiment, the outlet channel can also function as a bracket 42 which attaches the filter of the subject invention to an aquarium (see FIGS. 2–4).

Flow through the filter may be varied by using various pump sizes, by regulating the inlet flow, and/or through the use of a bleed valve 66 which can be used to reduce excess hydraulic pressure at the outlet. See FIGS. 2–4. The bleed valve can be used to, for example, direct a portion of the water back through the filter.

Both the heat dissipation and the aeration effects of the filters of the subject invention can be modulated in one embodiment of the invention which comprises a flow diffuser 46 on the outside of the column. The flow diff-user adjusts, interrupts, or directs the flow of the water down the outside of the main column or through the outlet channel. The flow adjuster (diffuser) may be, for example, an 0-ring on the outside of the cylinder. An 0-ring, or similar device, is particularly advantageous because it can easily be moved along the length of the cylinder, thus enabling its use to modulate the flow precisely.

In one embodiment of the subject invention, a fluidized bed filter is shown generally in FIG. 1. The filter comprises a main cylinder 10 closed at one end by, for example, an end cap, and open at the other end. The closed end may also be mounted on a base. The inlet port 20 is at the base of the cylinder. A fine particulate filter medium is placed within the chamber 18.

Water to be treated can be pumped into the inlet port 20. When the flow rate of the water being pumped into the tube exerts sufficient force to overcome the inertia of the filter medium, the filter bed will expand, or "fluidize."

Flow rate within the system is regulated so as to provide adequate fluidization of the filter medium but to prevent flushing of the medium out of the open end of the cylinder. Flow rate can be controlled using a flow valve at the inlet port 20. This valve may take many forms. In one embodiment, the size of the entrance port may be adjustable, which can then be used to adjust flow rate. In a specific embodiment, the main cylinder can rotate inside an outer cylinder. Both cylinders have entrance ports. Flow rate is at a maximum when the entrance ports of both cylinders are aligned identically.

The main cylinder 10 of the subject invention can be of any appropriate size to facilitate adequate treatment. Thus, the size would typically depend on the flow rate needed to operate the system. The filters of the subject invention can be built to accommodate virtually any flow rate. In aquaculture systems, for example, smaller filters may be used which have a flow rate of 1 gallon per minute or less. Larger filters for commercial operations can treat 500 gallons per minute or more.

Typically, the main cylinder will be between about 6 inches and about 8 feet in length and between about 1 inch and about 4 feet in diameter.

Figure 2:
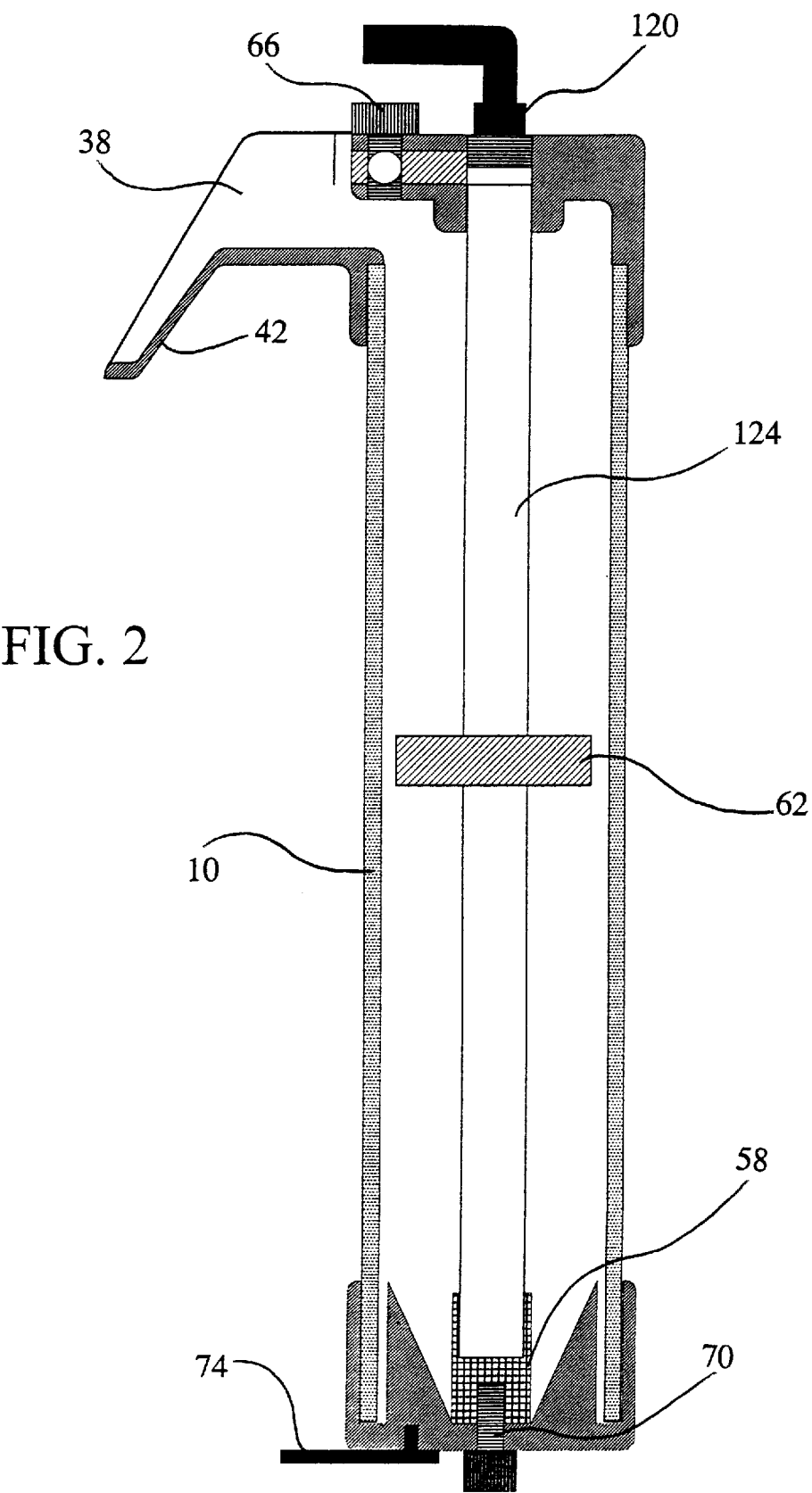
FIG. 2 shows an embodiment of the invention where the outlet channel can also function as a bracket which attaches the filter of the subject invention to an aquarium.
Figures 3A, 3B:
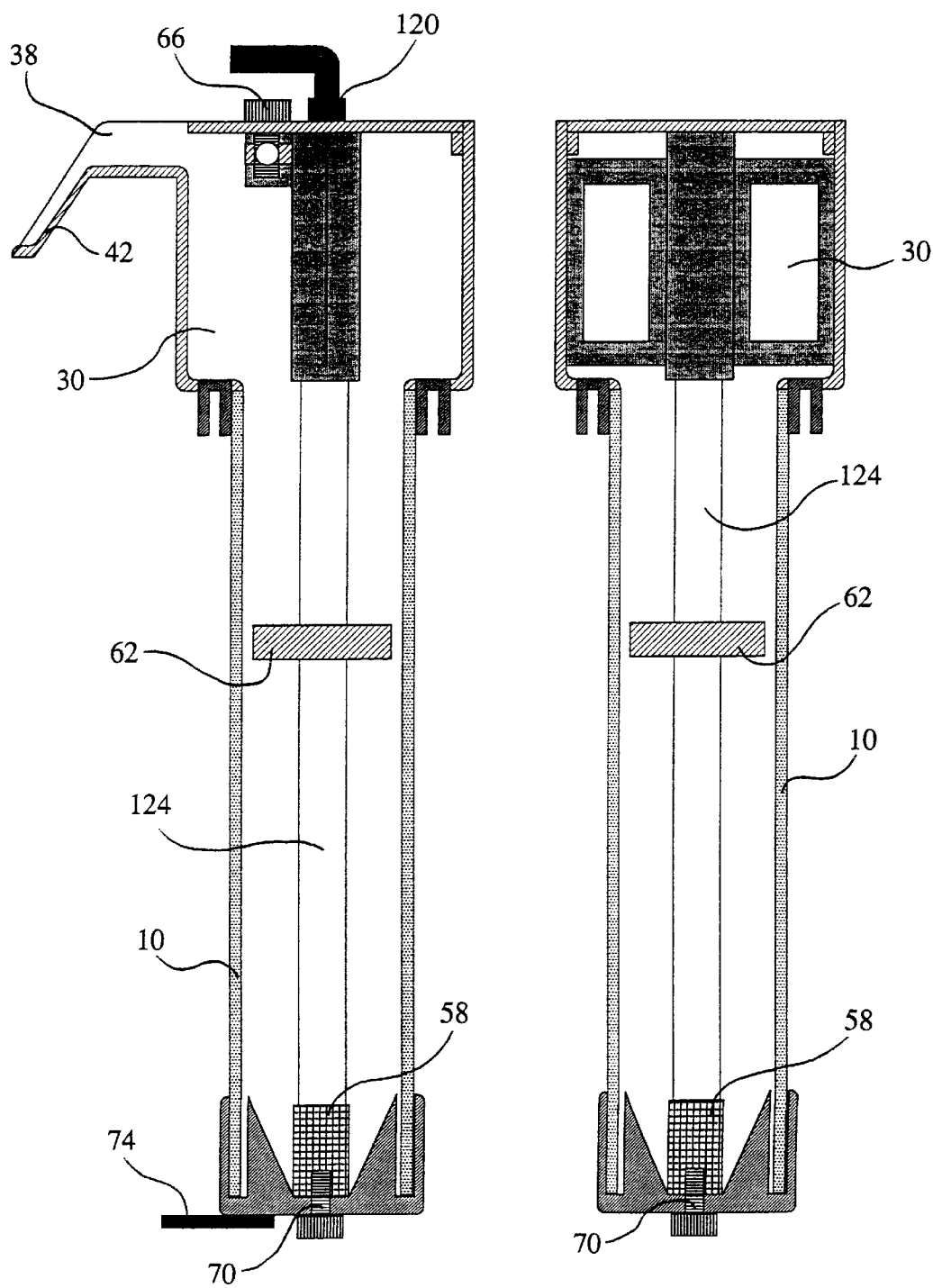
FIGS. 3A and 3B show an embodiment of the invention with a step-out in the main cylinder.
Figure 4:
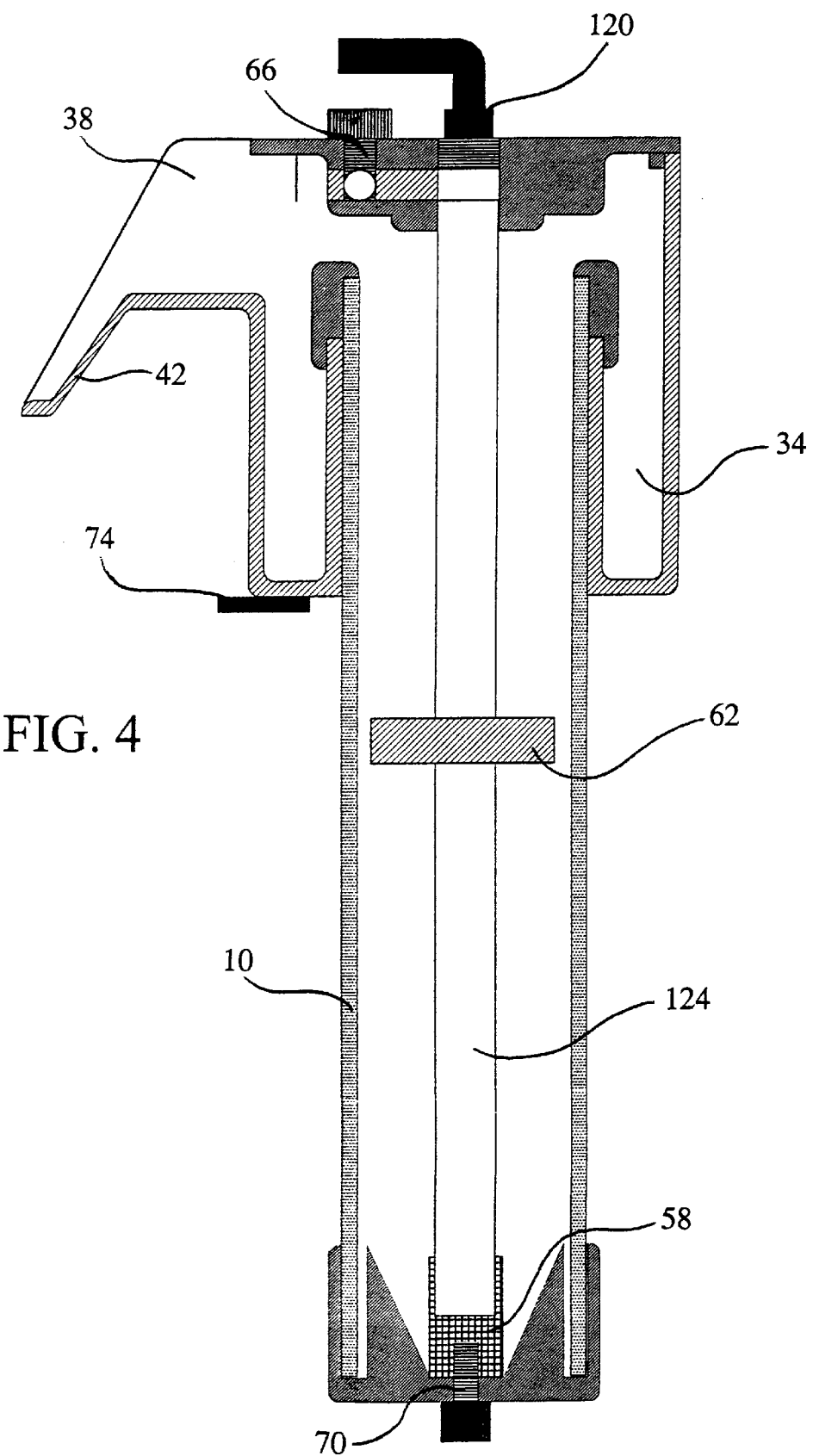
FIG. 4 illustrates an embodiment of the invention with a sand trap connected to the main cylinder.

More preferred embodiments of the subject invention are shown in FIGS. 2–4. Each of these figures shows the hollow delivery tube 124, a bed-breaker on the hollow delivery tube 62, a screen 58 around the outlet portion of the hollow delivery tube, a drain 70, a bleed valve 66, and an outlet channel 38. FIGS. 3A and 3B further illustrate a step-out 30 in the main cylinder. FIG. 4 illustrates a sand trap 34 around the main cylinder.

Figure 5:
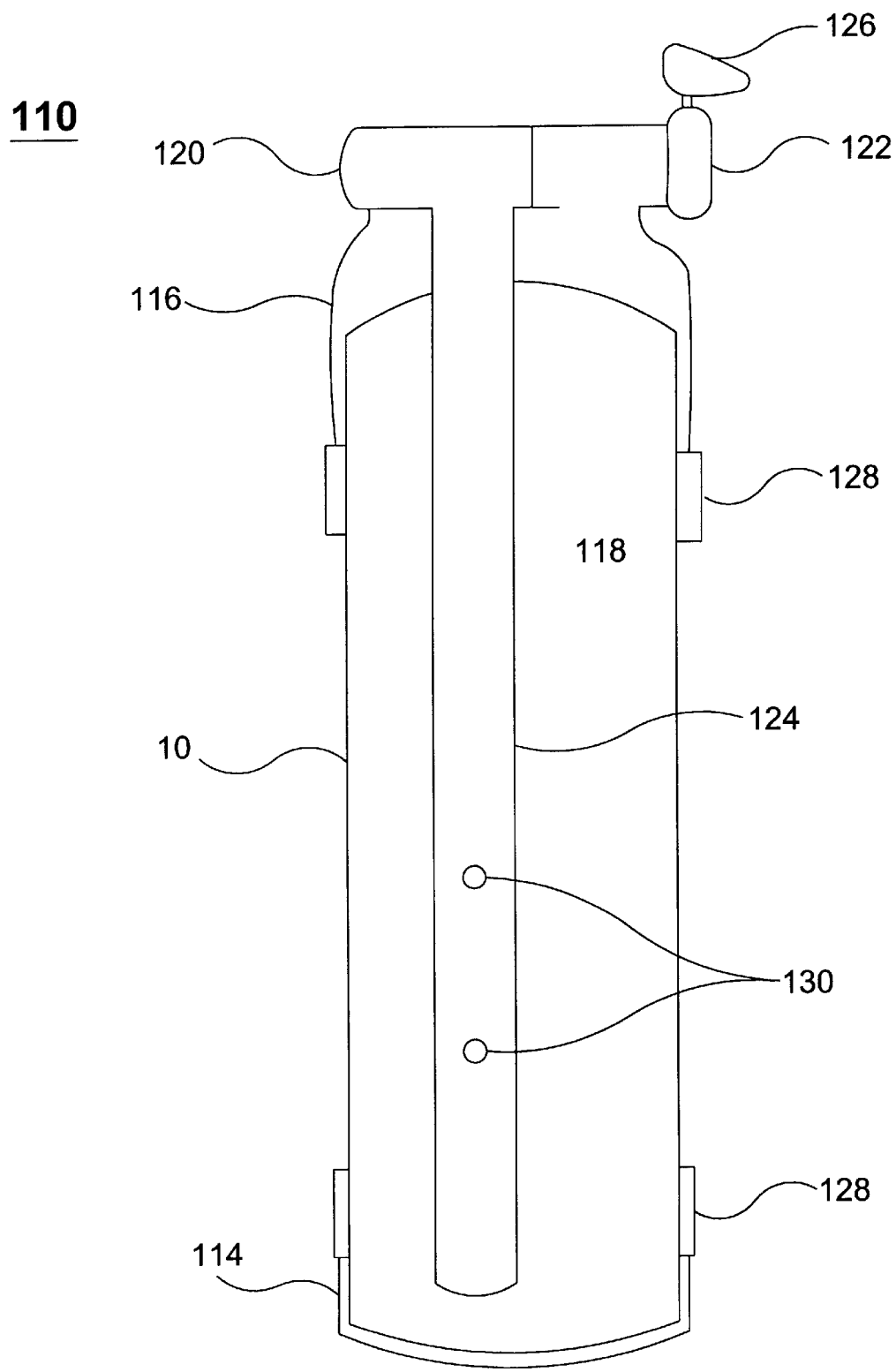
FIG. 5 illustrates a pressurized embodiment of the fluidized bed filter of the subject invention.

Although an unpressurized outlet flow through, for example, a channel is preferred, in one embodiment, the subject invention can be a pressurized, fluidized bed filter as shown generally at 110, FIG. 5. The filter comprises a main cylinder 10 closed at one end by an end cap 114 and at the other end by a tank head 116 to form an inner closed chamber 118. The tank head 116 has an inlet port 120 and an outlet port 122. The inlet port 120 is attached to a hollow delivery tube 124 which is open at the opposite end and is disposed within the closed chamber 118 running along the longitudinal axis of the cylinder. As with the unpressurized filter, the hollow delivery tube 124 terminates just above the end cap 114. A fine particulate filter medium is placed within the closed chamber 118.

Figure 6:
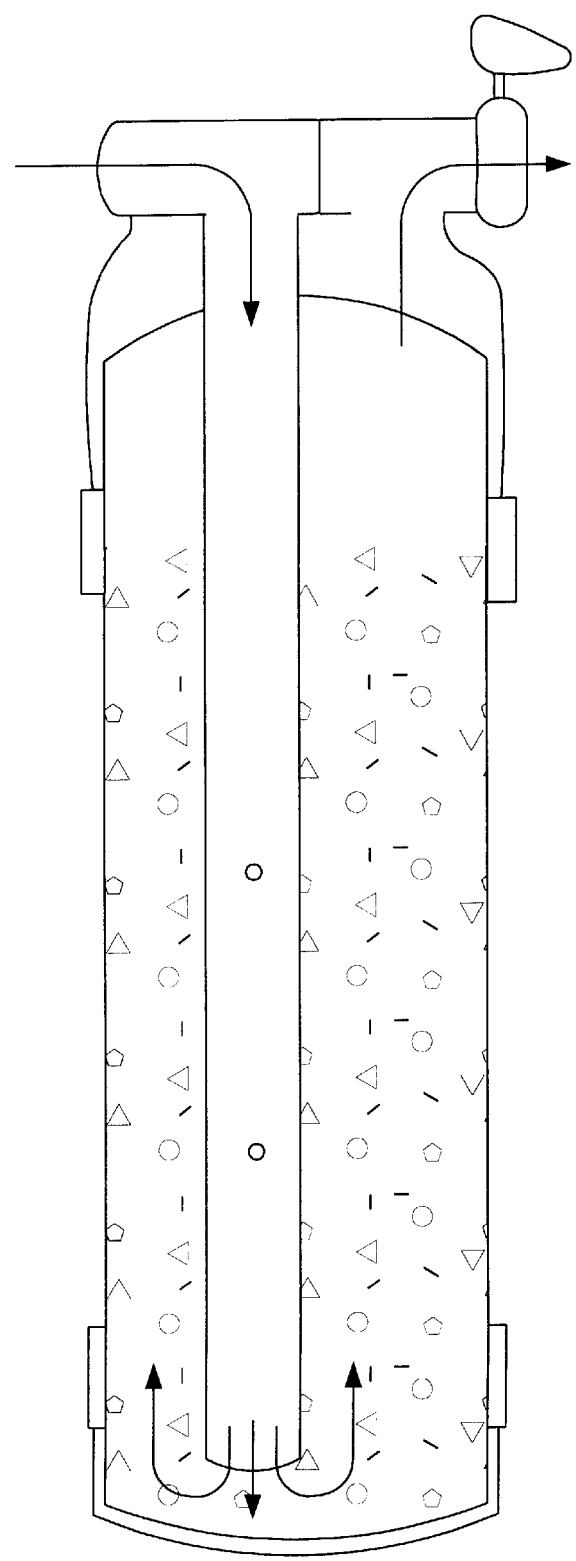
FIG. 6 illustrates a pressurized filter of the subject invention in operation.

The pressurized filter of the subject invention is shown in operation in FIG. 6. Water to be treated is pumped into the inlet port 120 and through the hollow delivery tube 124. As the water exits the hollow delivery tube it is deflected off the end cap 114 which changes the direction of flow and creates a flow pattern. As with the unpressurized filter, when the flow rate of the water being pumped into the tube and deflected off the end cap exerts sufficient force to overcome the inertia of the filter medium, the filter bed will expand, or "fluidize."

In operation, the filter is preferably slightly pressurized, which provides the following advantages:

(a) The filter can be mounted in any vertical position in relation to the aquarium, either above or below the tank's water level.

(b) The pressurization provides a more even flow (plug flow) of water within the filter. Since the medium is very sensitive to even slight eddies and currents, the pressure-balanced flow greatly smooths out the bed expansion within the filter, allowing it to operate more predictably at lower water (and energy) flow rates.

(c) Water under pressure has a slightly higher oxygen content, which allows for even more bacteria to colonize the filter's media.

Flow rate within the system is regulated so as to provide adequate fluidization of the filter medium but to prevent flushing of the medium through the outlet port and from the system. Flow rate can be controlled using a flow valve 126 at the outlet port 122. The filter of the subject invention need not include a flow valve to control flow rate. Flow rate can be controlled by the rate at which material is pumped into the system.

The hollow tube fluidized bed filter of the subject invention is highly advantageous because the flow is introduced into the cylinder in such a fashion that the filter does not clog or choke during periods of low or no flow rate. The method of introducing the flow via a delivery tube greatly simplifies construction, mounting, and operation of the filter. The filters of the subject invention are particularly advantageous because the manner in which materials are introduced into the filter medium reduces the flow requirements needed for proper fluidization of the medium, when compared to other filters of this type. This allows for greater contact time between the materials to be filtered and the medium and more efficient removal of waste.

The media used in the filters of the subject invention can be a fine particulate, usually silica or sand. The filter media must be hard enough to resist pulverization by the action of the system. The media must also have a density that permits complete fluidization at a flow rate compatible with the system. The optimal flow rate for an aquaculture biofilter is determined by the rate at which the bacteria that colonize the filter media can process ammonia waste in the water. Water at a higher flow rate is retained within the system for a shorter period of time. The "ammonia-eating" bacteria therefore are in contact with the waste for a shorter period of time. This can result in the incomplete removal of ammonia from the water. Heavy or dense particles require higher flow rates to fluidize the media and also tend to settle. Less dense particles, although requiring lower flow rates for fluidization, may be too light to hold their position within the filter and be flushed from the system. Filter media must be selected that will fluidize at a flow rate which allows adequate retention time for complete ammonia waste removal. Additionally, filter media having a round or relatively round shape provide maximum surface area on which bacteria in a biofilter can colonize. It is generally recommended in aquaculture that a surface area of about three square feet per pound of fish be provided. Maximum surface area means more bacteria per filter to process waste. In one embodiment, silica having about 36–40 square feet of surface area per pound can be used in an aquaculture biofilter at a flow rate of –1½ gallons per minute.

In a preferred embodiment, the filter bed is a mixed media design, wherein a small amount of a denser material (gravel) is placed in the bottom of the filter before sand is added. When the filter is turned off, the heavier gravel prevents the lighter sand from back-flowing into the center tube.

The flow rate used according to the subject invention should be sufficient to flush deposited materials from the medium. Deposits in the filter medium can cause channeling within the system. Channeling involves the buildup of material within the system which restricts the available space in which the fluidized material may circulate. As the same amount of material is forced through less space, flow within the system increases. Thus, when channeling occurs, retention time within the system is reduced. In an aquaculture biofilter, the bacteria colonizing the filter medium have less time to act upon the water. Further, filter medium that is deposited in crevices and corners no longer present all available surface area to the circulating water. Therefore, fewer bacteria are coming into contact with more water for less time. Under these circumstances, treatment of the water becomes incomplete. Bits of food and solid matter can also become trapped in channeled areas further restricting flow.

Terminating the flow of the water through a vertically mounted filter causes the filter medium to settle by gravity to the bottom of the cylinder. If the medium sits in the bottom of the cylinder for an extended period, it may start to pack or compress, forming a column of hardened filter medium that is resistant to refluidization. Refluidization of the hardened bed could require forces in excess of what are normally required in an active system. To assist in breaking the resistance that may result from this settled medium, release holes 130 can be bored into and positioned along the hollow delivery tube 124. Release holes will normally be positioned below the level of the fluidized bed and often below the level of the non-fluidized bed. Release holes may also be bored above the level of the fluidized bed. Water exits these release holes to break the settled bed in layers. Water exiting from the end of the hollow delivery tube disturbs the remaining material and the bed is refluidized. Alternatively, the filter can be equipped with one or more bed-breakers 62 as shown in FIGS. 2–4. This bed-breaker, which is preferably disposed about the hollow delivery tube, has outward radial projections which function to break up the filter media if the media begins to rise as a unitary mass. Under proper fluidized conditions, the media can freely move around and between the radial projections of the bed-breaker.

Although the filter of the subject invention is specifically exemplified for use in a vertical position, the filter may be mounted at any angle in which the flow pattern created by the force of the water through the hollow delivery tube will produce sufficient force to fluidize the filter medium. The filter can be mounted using a number of means including mounting clamps 128, as exemplified, or clips, ties or specially designed stands. A filter for use with home aquariums can be mounted in a set of brackets which are attached to a hanger or hook that rests over the rim of the aquarium tank. The brackets fit snugly around the filter to hold it securely in place. As discussed above, the brackets which attach the filter to an aquarium may also be adapted to serve as the outlet channel for water exiting the filter. The filter may also have projections 74 which cause it to hang vertically on the back of an aquarium. See FIGS. 2–4. These projections effectively hold the bottom portion at the same distance from the aquarium as the top portion.

The filter of the subject invention can be constructed from a variety of materials. As exemplified, the filter is designed for use in an aquaculture system. The parts and pieces of this filter therefore should be resistant to rust and corrosion. Further, the materials from which the filter is made must be able to be sealed so that the filter is water-tight. Plastics are resistant to rust and corrosion and can be caulked with silicon or other sealants to be water-tight. Clear plastics can be used for the main cylinder to allow visual monitoring of the flow within the system. Other materials from which filter parts can be constructed include materials such as stainless steel or any material that has sufficient rigidity and tensile strength to hold the form of the filter and withstand the force of the flow rate.

The filter of the subject invention can be provided in a kit for home aquarium use. The kit can comprise the fluidized bed filter and a pump, such as a seven-watt pump commonly used in aquarium systems. The pump provides the filter with an adequate flow rate of aquarium water to fluidize the filter bed. The kit can further comprise a mechanical, sponge-type filter to be placed in line before the fluidized filter to remove particulate waste.

A person skilled in the art having the benefit of the disclosure provided here could readily adapt the fluidized bed filter of the subject invention for use in removal of toxins and wastes from environmental samples such as water and soil samples, and mine tailings. These toxins and wastes may be, for example, cyanide, ammonia and other nitrogenous wastes, and hydrocarbons. Endogenous bacteria can be used, or the bed can be inoculated with specific bacteria. Bacteria which degrade specific compounds or classes of compounds are well known in the art and are readily available. See, for example, U.S. Pat. Nos. 4,833,086; 5,132,224; 5,221,327; 5,242,825; 5,248,329; 5,283,192; 5,413,624; and 5,422,268.

Following are examples which illustrate procedures for practicing the invention. These examples should not be construed as limiting.

EXAMPLE 1

Operation of the Fluidized Bed Filter

1. The water to be filtered is pumped into the cylinder by means of an external pump.

2. The water enters the cylinder and rises through the filter medium in the main cylinder and exits via the open end of the cylinder.

3. By increasing the flow through the filter medium, the inertia of the water will overcome the density of the medium, causing the filter bed to expand and fluidize.

4. The percentage of medium expansion is controlled by regulating the water flow.

5. The flow rate should be kept low enough to prevent flushing the medium out of the filter.

EXAMPLE 2

Construction of a Pressurized Fluidized Bed Filter

The following is a detailed description of the materials, construction, and operation of a fluidized bed filter of the subject invention.

Materials list with specifications:
Quantity
- 1 Tank head from Park International
- 1 Schedule 80 female adapter, 2½ inches, Spears Manufacturing Company
- 1 Schedule 80 end cap, 2½ inches, Spears Manufacturing Company
- 1 2½ inch clear tube, 24 inches in length, Excelon Company
- 1 ½ inch tube, 26 inches in length, Excelon Company
- 2 2½ inch mounting clamps, CLIC
- 1 Uni-Weld cement, United Elchem Ind., Inc.
- 1 Water flow valve, any quality unit
- 3 lbs. quartz silica, medium grade Construction:

1. Cement the female adapter to one end of the 2½ inch clear tube, and the end cap to the other end of the same clear tube.

2. Cement the ½ inch clear tube into the inlet port of the tank head.

3. Measure 10 inches up from the open end of the ½ inch tube, then drill a ¼ inch hole through one side of the tube, perpendicular to its length.

4. Cement the tank head into the cylinder created in Step 1.

5. Add the medium to the cylinder through the fill port provided in the tank head. The amount of medium should fill the cylinder approximately half full.

6. Attach the water flow control valve to the tank head.

7. Attach the two mounting clamps to the cylinder and mount the filter vertically.

8. Pressure test the unit, with 30 psi of air, to insure that there are no leaks in any of the mating surfaces.

EXAMPLE 3

Operation of the Fluidized Bed Filter

1. The water to be filtered is pumped into the cylinder by means of an external pump.

2. The water enters the cylinder and flows downward through the ½ inch tube.

3. The water exits this tube and deflects off the bottom of the cylinder, which is approximately ½ inch from the outlet of this tube. This forces the water to change direction from downward to upward in the larger surrounding main cylinder.

4. The water rises through the filter medium in the main cylinder and exits via the top of the cylinder.

5. By increasing the flow through the filter medium, the inertia of the water will overcome the density of the medium, causing the filter bed to expand and fluidize.

6. The percentage of medium expansion is controlled by regulating the water flow via the valve on the filter.

7. The flow rate should be kept low enough to prevent flushing the medium out of the filter.

8. The purpose of the ¼ inch hole in the ½ inch tube is to provide a means of "breaking" the filter medium apart, should the pump flow be interrupted.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A fluidized bed filter for filtering aquarium water wherein said filter comprises:
   (a) a main hollow column having one closed end forming a chamber with one open end;
   (b) an inlet port but no outlet port except for and open outlet channel for conveying said water as it exits said chamber;
   (c) a filter medium disposed within said chamber; and
   (d) a hollow delivery tube comprising a top end and an open bottom end, wherein said top end is mounted to said inlet port, with said hollow delivery tube extending into said chamber terminating above said closed end wherein said said open bottom end of said delivery tube is directed towards said first closed end of said chamber such that, when the filter is in operation, the force of said water to be filtered exiting said hollow delivery tube, through said open bottom end, is sufficient to prevent filter media from accumulating between said hollow delivery tube and said first closed end;
   wherein the force exerted by said aquarium water as it exits the hollow delivery tube and enters the main hollow column fluidizes said filter medium and said water exits through said outlet channel; and wherein said filter is adapted to be hung on an aquarium such that said outlet channel delivers said filtered water to said aquarium.

2. The filter, according to claim 1, further comprising a bed-breaker.

3. The filter, according to claim 2, further comprising a screen around the outlet of said delivery tube.

4. The filter, according to claim 1, wherein said main hollow column comprises a step-out wherein the diameter of said column increases.

5. The filter, according to claim 1, further comprising a sand trap located at the periphery of said main hollow column to catch any sand which exits over the top of said column.

6. The filter, according to claim 1, further comprising a drain port.

7. A method for filtering aquarium water wherein said method comprises removing water from an aquarium and introducing said unfiltered water into a fluidized bed filter comprising
   (a) a main hollow column closed at one end forming a chamber;
   (b) an inlet port but no outlet port except for an open outlet channel for conveying said water as it exits said chamber;
   (c) a filter medium disposed within said chamber; and
   (d) a hollow delivery tube comprising a top end and an open bottom end, wherein said top end is mounted to said inlet port, with said hollow delivery tube extending into said chamber terminating above said closed end wherein said said open bottom end of said delivery tube is directed towards said first closed end of said chamber such that, when the filter is in operation, the force of said water to be filtered exiting said hollow delivery tube, through said open bottom end, is sufficient to prevent filter media from accumulating between said hollow delivery tube and said first closed end;
   wherein aquarium water to be filtered enters said inlet port, wherein the force exerted by said aquarium water as it exits the hollow delivery tube and enters the main hollow column fluidizes said filter medium and said water exits through said outlet channel into said aquarium.

8. A kit for use with a home aquarium comprising:
   (a) a fluidized bed filter comprising
      (i) a main hollow column having one closed end forming a chamber;
      (ii) an inlet port but no outlet port except for an open channel for conveying said water as it exits said chamber;
      (iii) a filter medium disposed within said chamber; and
      (iv) a hollow delivery tube comprising a top end and an open bottom end, wherein said top end is mounted to said inlet port, with said hollow delivery tube extending into said chamber terminating above said closed end wherein said said open bottom end of said delivery tube is directed towards said first closed end of said chamber such that, when the filter is in operation, the force of said water to be filtered exiting said hollow delivery tube, through said open bottom end, is sufficient to prevent filter media from accumulating between said hollow delivery tube and said first closed end; and
   (b) a pump,
   wherein said pump can be operatively connected to said inlet port of said filter to supply said material to be filtered.

9. The kit, according to claim 8, further comprising a mechanical filter to be positioned between said pump and said fluidized bed filter when said pump is in operation.

* * * * *